United States Patent [19]

Ranallo et al.

[11] Patent Number: 4,935,950
[45] Date of Patent: Jun. 19, 1990

[54] INSTRUMENT FOR THE MEASUREMENT OF X-RAY BEAM CHARACTERISTICS

[75] Inventors: Frank N. Ranallo; Larry A. DeWerd; Joseph Muehlenkamp, all of Madison, Wis.

[73] Assignee: Radiation Measurements, Inc., Middleton, Wis.

[21] Appl. No.: 277,148

[22] Filed: Nov. 28, 1988

[51] Int. Cl.$^5$ ............................................. G01D 18/00
[52] U.S. Cl. ........................................ 378/207; 378/98
[58] Field of Search ................................ 378/207, 98

[56] References Cited

U.S. PATENT DOCUMENTS

| | | | |
|---|---|---|---|
| 4,355,230 | 10/1982 | Wilson | 378/207 |
| 4,697,280 | 9/1987 | Zarnstorff et al. | 378/207 |
| 4,843,619 | 6/1989 | Sheridan | 378/207 |

OTHER PUBLICATIONS

Model 6000A Nero.
Model 6000B Nero.
The Nero 6000B Makes X-Ray Machine Performance Studies as Easy as Possible.
BlockDiagram Digi-X.
Digi-X Plus Announcement in Second Source Apr.-/May 1988.
Rothenberg & Fleischman, *Extensive Evaluation of Commercially Available Non-Invasive Electronic kVp Measurement devices*, 8 1-5, '82.
Campbell, Yaffo & Taylor, *Measurement of Time Variations of X-Ray Beam Characteristics*.
Photon Physics KV Measuring Instrument.
Digi-X-Plus.
How Would You Picture The Ultimate X-Ray Meter?
Victoreen 6000A Nero Noninvasive X-Ray Evaluation System.

*Primary Examiner*—Craig E. Church
*Attorney, Agent, or Firm*—Quarles & Brady

[57] ABSTRACT

An instrument for measuring the characteristics of an x-ray unit includes two pairs of photo detectors to measure the kVp of the x-ray beam, a single photo detector to measure the relative film exposure produced by the beam and another single photo detector used to measure the relative current in milliamps (mA) of the x-ray unit. The instrument multiplexes the signals and converts them to digital form for storage and analysis by a microprocessor. The output is a display the contents of which is user selectable either by a switch panel or through use of a remote control unit.

5 Claims, 2 Drawing Sheets

INSTRUMENT FOR THE MEASUREMENT OF X-RAY BEAM CHARACTERISTICS

FIELD OF THE INVENTION

This invention pertains generally to the field of devices which measure radiation and particularly to such devices used to measure the output radiation characteristics of x-ray machines.

BACKGROUND OF THE INVENTION

In general, the energy level of emitted x-rays from an x-ray machine varies directly with the high voltage potential across the x-ray tube. The x-ray machine output is usually rated in terms of the maximum applied potential (kVp), which corresponds to the highest energy x-ray photons emitted from the source, since the highest energy photons determine the effective penetration of the x-ray beam.

The actual kVp applied to the x-ray tube may not be equal to the kVp setting indicated on the control panel of the x-ray machine. Thus it is useful to periodically check the accuracy of the kVp setting and recalibrate if necessary. It is difficult to directly measure the voltage applied across the x-ray tube, therefore it is preferable to take measurements of the x-ray beam, and from those measurements deduce the kVp.

One device, the kVp meter, utilizes a pair of x-ray detectors located behind filters of different filtration characteristics. The kVp may be determined from the ratio of the output signals of the two detectors. The detectors are typically semi-conductor photodiodes placed closely adjacent to one another to sample the same portion of the x-ray beam. One such digital kVp meter is disclosed in the specification of U.S. Pat. No. 4,697,280 to Zarnstorff and Ranallo.

It has been found useful to design detectors such that the center of the area of both detectors is the same, thereby eliminating cathode-anode dependency of the meter.

It has also been found necessary to amplify the output of the detectors, to allow easier comparison of the outputs. The outputs of the detectors may vary over a wide range, based on the kVp selected, as well as the mA selected. Due to this wide range of output levels, it is necessary to have an adjustable gain amplifier. This may be accomplished by having a circuit that adjusts the gain based on the output of the amplifier, wherein the gain is initially at the maximum and is adjusted downward until the output of the amplifier falls below a given level.

Prior art devices have either sampled and summed or integrated the amplified outputs of the detectors over time. The ratio of the first integrated or summed value to the second integrated or summed value is taken and the kVp is determined from this ratio. Corrections are made for different types of x-ray machines. Since the data was summed or integrated, the actual parameter measured was the average or effective kVp. In other words the meter smooths out the ripple present in any non-constant potential x-ray unit and does not measure actual peak kV.

SUMMARY OF THE INVENTION

The x-ray beam characteristic measurement apparatus in accordance with the present invention utilizes four detector units, each responsive to the intensity of x-rays incident upon it to produce an output signal related to the incident x-ray intensity. Two of the detectors are used in determining the kVp, and have different amounts of copper filtration over them. The kVp detectors are positioned so that the center of their areas coincide. The third detector has a thin copper filter over it, and is used to calculate the relative film exposure. The fourth detector does not have any filtration over it, and is used to determine the relative mA of the x-ray tube.

The output signals of the first two detector units are provided to adjustable gain current-to-voltage amplifiers. The output of the third and fourth detector units are provided to constant gain integrating amplifiers. The four amplified signals are multiplexed to an analog-to-digital converter, which provides an eight-bit output. The digital output bits from the first and second detector units are stored in a memory in chronological order as controlled by the microprocessor. The digitized integrated values from the third and fourth detectors are also stored in the memory.

The stored data is used to calculate various characteristics of the x-ray beam. The effective kVp may be determined by summing the data from the time at which the final gain adjustment was made to the time at which the x-ray beam terminated. This summation is performed for the first and second detector units. The summed values are compared, and a ratio is taken. The effective kVp is determined on the basis of the calculated ratio. Since all data points are used in making this measurement the ripple found on any non-constant potential x-ray unit will be filtered out, to produce an effective kVp.

The type of x-ray unit that is being used is determined during the first exposure by measuring the peaks and valleys, and comparing the peak magnitude to the valley magnitude, as well as measuring the time between peaks. A peak is found by finding the local maximum when the pulse is rising, and a valley is found by finding the local minimum when the pulse is falling.

The present invention measures time, where the length of the exposure is defined as the point that is twenty percent of the average peak in the rising edge of the wave form and twenty percent of the average peak on the falling edge of the wave form. For a single phase unit pulses are counted.

The output of the third detector is used to determine relative film exposure. The fourth detector is used to determine relative mA, and may be used to determine linearity between mA stations. For example if an exposure is made with the x-ray unit set at 50 mA, the user notes the mA reading on the meter. When the x-ray unit mA station is changed to 100 mA, the relative mA reading should also double.

The measurements made may be displayed on a LCD output, and the particular measurement displayed may be controlled on the front panel of the meter, or using an infrared remote control.

The present invention thus allows for measurement of actual kVp, as well as effective kVp, mA linearity, exposure time, number of pulses, and relative film exposure.

Further objects, features, and advantages of the invention will be apparent from the following detailed description when taken in conjunction with the accompanying drawings.

DETAILED DESCRIPTION OF THE PREFERRED EMBODIMENT

Figure 1:
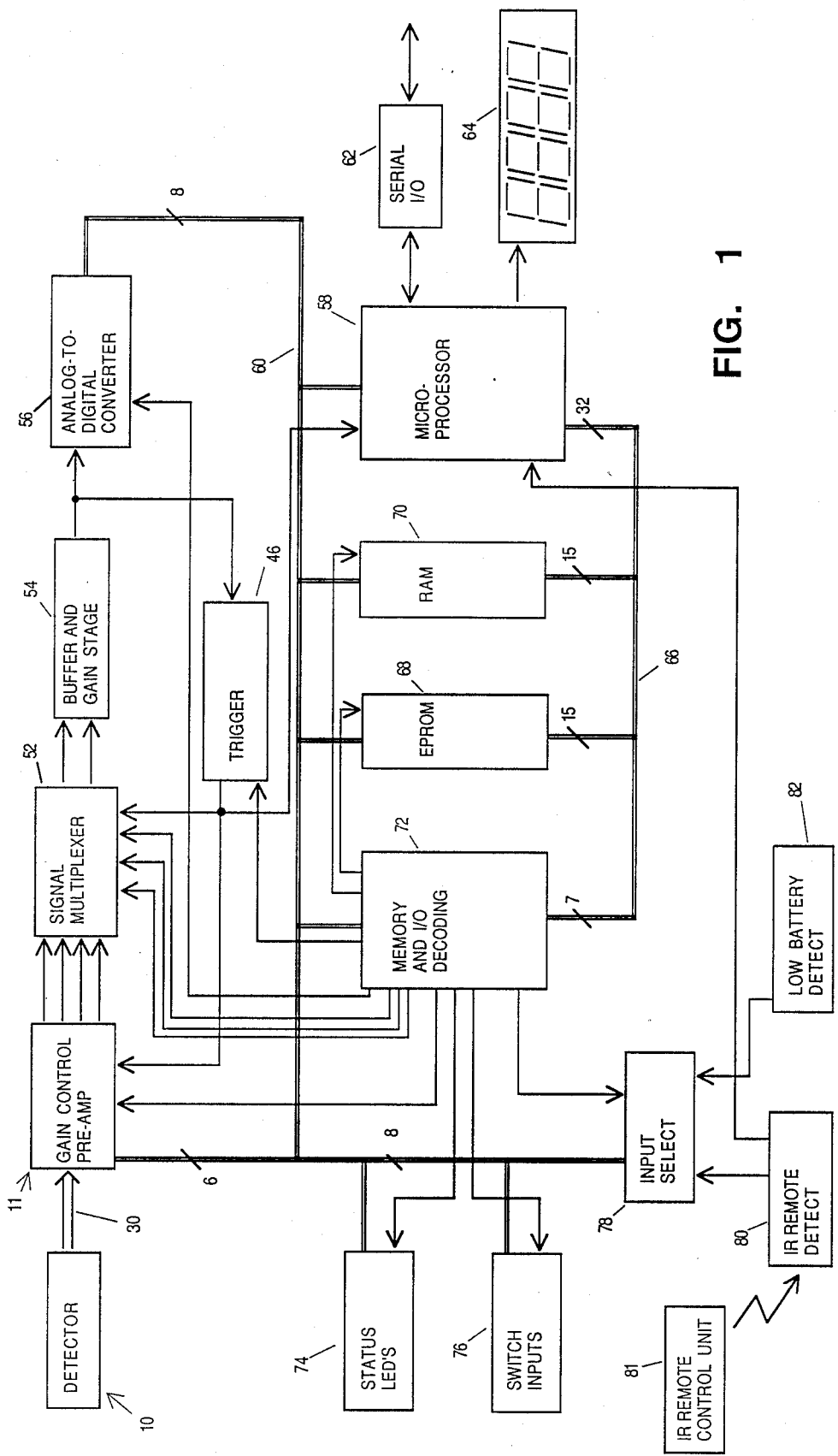
FIG. 1 is a schematic diagram of an x-ray beam measurement apparatus constructed in accordance with the present invention.

Referring to the drawings, FIG. 1 shows a block diagram of major circuit components of the present invention. The present invention has a detector assembly, represented by 10, containing within it six photodiode photo detectors, four assembled into two pairs and two unpaired photo detectors. The photodiodes themselves are represented at 12, 14, 16, 18, 20 and 22 in FIG. 2. The first and second detector pairs, i.e. photodiodes 12 and 14 and 16 and 18, are used to determine actual kVp and effective kVp. The first unpaired detector photodiode 20 is used to determine relative film exposure. The second unpaired detector photodiode 22 is used to determine relative mA. The photo detectors 12, 14, 16 and 18 used to determine effective and actual kVp are also used to determine the length of time of the exposure and the number of pulses of exposure.

Figure 2:
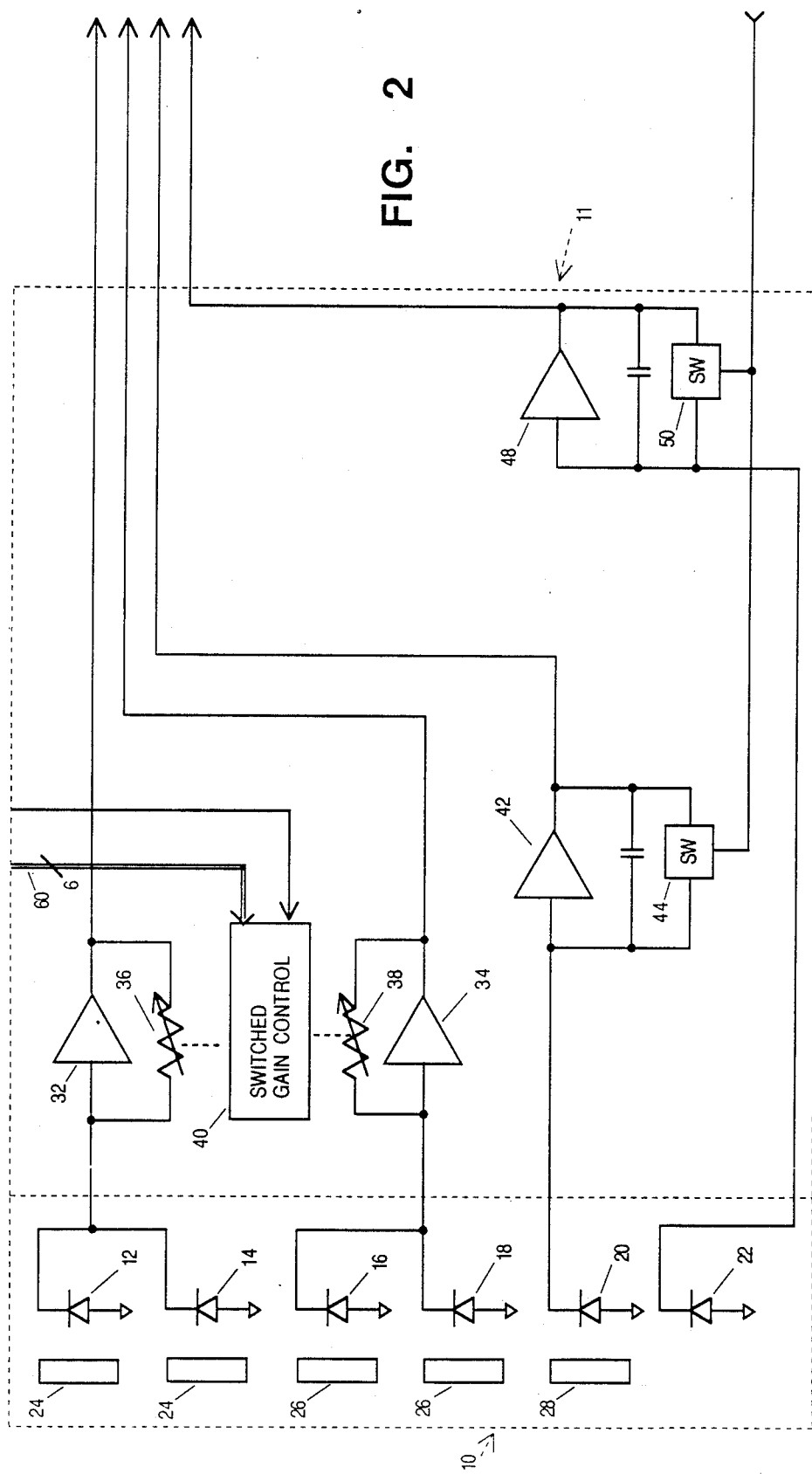
FIG. 2 is a schematic diagram of a portion of the circuit of FIG. 1.

The first and second detector diode pairs 12 and 14 and 16 and 18 are each connected in parallel as shown in FIG. 2. The first detector pair 12 and 14 has a one millimeter copper filtration sheet 24 physically placed over the diodes, and the second detector unit has a two millimeter copper filtration sheet 26 physically positioned over the diodes. The diodes composing the first detector pair are arranged in diagonal quadrants of a square centered in the measurement region. The diodes composing the second detector pair are arranged in the remaining diagonal quadrants. The diodes produce current when radiation impinges on them, and the current is dependent on the intensity of the impinging radiation. This general configuration of paired photodetectors and its use in kVp measurement is illustrated and explained in more detail in U.S. Pat. No. 4,697,280, the specification of which is hereby incorporated by reference. The physical orientation and arrangement of the photodiodes 12, 14, 16 and 18 is similar to the orientation and arrangement shown in said patent.

The photodiode 20 is intended for measurement of relative film exposure (RFE) to determine the exposure consistency of an x-ray machine. The RFE photodiode 20 is placed under a 0.5 mm copper filtration sheet 28. The photodiode 20 is placed on the instrument case adjacent the photodiodes 12-18 so that the x-ray beam also is incident upon it as well.

The photodiode 22 is intended for measurement of milliamp (mA) linearity. This diode is not filtered by copper, and is used to create a signal which may be integrated over the x-ray exposure and stored as a representation of relative mA for successive x-ray exposures. Again this photodiode 22 is physically placed in the projected path of the x-ray beam.

The output of each detector unit is carried on multiconductor cable 30 to a gain control pre-amp circuit 11 also illustrated in FIG. 2. Each photo detector unit output is provided to a separate amplifier. The output of the first pair of photodiodes 12 and 14 is provided to a first variable gain amplifier 32. The output of a second pair of photodiodes 16 and 18 is provided to a second variable gain amplifier 34. The gain of the amplifiers 32 and 34 are controlled by changing the value of the feedback resistors, as indicated schematically in FIG. 2 by variable resistors 36 and 38 and switched gain control circuit 40. An efficient way to implement such a gain control circuit 40 is through use of an analog switching circuit connected to a "T" network of resistors so that the feedback resistance in each amplifier may be adjusted by switching resistors in or out using the analog switching circuit. Another implementation of such switched gain control is illustrated in said U.S. Pat. No. 4,697,280. The input control signal to the switched gain control comes from data lines from the data bus 60 of the microprocessor 58, described below. The switched gain control circuit 40 is assigned an address in microprocessor addressable memory so that, when the gain control circuit 40 is selected, a data word from the microprocessor 58 is read into the switched gain control circuit 40 to select the gain for the amplifiers 32 and 34.

The amplifiers 32 and 34 are initially adjusted to have the maximum gain possible, and both are incremented downward until the output of the first variable gain amplifier is less than or equal to a predetermined level. This is done so that signal can be most sensitively detected after which gain is reduced so the received signal can be best analyzed. The gain of the amplifiers is controlled by the microprocessor such that the two gains are always equal.

The output of the photodiode 20 for RFE measurement is connected to an amplifier 42 which is connected as an integrator to integrate the signal from the photo detector 20. The integrated output is proportional to relative film exposure. An analog switch 44 is connected across the amplifier 42 so as to switch off, to enable the amplifier 42, only when directed to do so. The analog switch 44 is controlled by a signal generated by a trigger circuit 46 which generates the enabling signal upon the detection of an x-ray signal by one of the photo detectors. This parameter is only used when radiographic, as opposed to fluoroscopic, instruments are being tested.

The radiation detector module also has a separate unfiltered photodiode 22 for determining milliampere (mA) linearity of the x-ray unit. This parameter is also used only for radiographic instrument analysis. The current generated by this detector is integrated by an operational amplifier 48. The amplifier 48 is also connected to an analog switch 50 which is enabled by the same signal which controls the analog switch 44. The integrated output voltage is used to determine the relative mA for an x-ray exposure. If the mA on the control panel of the x-ray emitter is doubled, then the output of the relative mA detected should also double. For the first exposure the mA is calculated as equal to the (output of the fourth detector)/(effective kVp *effective kVp* exposure time). That initial mA value is then saved for subsequent exposures. For subsequent exposures the mA is calculated as (the output of the fourth detector)/((effective kVp *effective kVp* exposure time)/first mA stored)*100. Thus successive mA from successive exposures are displayed with an easily understood relative value so that successive values can be compared to determine mA linearity.

The four outputs of the amplifiers 32, 34, 42 and 48 are connected as inputs to a signal multiplexer, shown schematically at 52 in FIG. 1. The signal multiplexer 52 is a dual four-input analog multiplexer connected so that on each of the two multiplexers, a selective one of the four input lines is presented at its output. One multiplexer is connected to multiplex the four outputs from the gain control pre-amp 11. The other multiplexer is connected to a resistor arrangement and is used to change the gain control on the following buffer amp and gain stage circuit 54. The two particular input signals to be presented through the dual multiplexers of signal multiplexer 54 are selected under the control of the microprocessor 58. Thus the particular input signal to be presented to the buffer and gain stage 54, and the amount of gain to be achieved, are separately selectable under software control.

The two outputs of the signal multiplexer 52 representing the input signal and the gain control signal are provided to buffer and gain stage 54. The additional gain stage 54 is used when the relative film exposure signal (diode 20), the relative mA signal (diode 22), or the signal from the kVp detectors (diodes 12, 14, 16 and 18) are relatively small. The gain may be set higher for small signals to provide an additional bit of resolution for these signals. The buffer and gain stage 54 also provides a stable low impedance to an analog-to-digital converter 56. The output of the buffer and gain stage 54 is provided to the analog-to-digital converter 54 by a signal line which is also connected as an input to the trigger circuit 46. The trigger circuit 46 provides an output signal when the input signal received at the input to the analog-to-digital converter 56 reaches a predetermined level. The trigger circuit provides an output which, as mentioned above, serves as an enable to amplifiers in the gain control pre-amp 11, and to the multiplexers in the signal multiplexer 52. This trigger signal is also connected as an interrupt input to the microprocessor 58.

The analog-to-digital converter 56 receives the output of buffer and gain stage 54 and creates an eight bit digital signal having a magnitude corresponding to the input analog signal to it. The output eight bits of the analog-to-digital converter 56 are connected to an eight bit data bus 60 of the microprocessor 58.

The microprocessor 58 is a general purpose microprocessor connected and programmed for the application described here. The embodiment illustrated here makes use of an HD 64180 microprocessor that is a CMOS processor implementing an enhanced Z-80 instruction set. The microprocessor 58 includes two asynchronous receiver/transmitter channels used here for communication with outside devices such as printers or computers through a serial I/O interface circuit 62 in FIG. 1. The microprocessor 58 also includes a single clocked, or synchronous, serial input/output port which is connected in the circuit of FIG. 1 to a four-digit seven segment display 64 located on the front panel of the instrument. This display 64 is used to selectively display the output values for the various parameters (kVp, RFE, time, mA) measured by the instrument. The microprocessor also has one non-maskable interrupt line which is connected to the output of the tirgger 46. Thus the detection of an input signal by the trigger 46, indicative of x-ray detection, interrupts the microprocessor 58 to commence its data collection routine.

The microprocessor 48 supports, besides the 8-bit data bus, an address bus 66 of up to 32 bits, only the least 15 of which are used here. An EPROM 68 is connected to the data bus 60 and the address bus 66 so as to be inserted in the address space of the microprocessor 58. The EPROM 68 is a 32k-byte EPROM which is capable of storing all operation and control coding necessary for the operation of the instrument. A 64k array of random access memory (RAM) 70 is connected to the data bus 60 and address bus 66 to provide operational memory for data and variables. A memory and I/O decoding circuit 72 is also connected to the busses 60 and 66. Among its other functions, the memory and I/O decoding circuit reads the more significant bits of the address bus 66 to determine which portion of memory is being addressed, and thus has outputs controlling the operation of the EPROM 68 and the RAM 70.

The memory and I/O decoding circuit 72 also decodes addresses and data bytes so as to selectively enable all the other portions of the circuit positioned in microprocessor address space and/or to which microprocessor data is directed. One output signal from the memory and I/O decoding circuit 72 is connected to the switched gain control circuit 40 in the gain control pre-amp 11 to enable the switched gain control circuit 40 to read a byte from the data bus 60, the byte containing the desired gain. Three outputs from the memory and I/O decoding circuit 72 are directed to the signal multiplexer 52, where two of the signals are used to specify which analog signal is passed through the multiplexer, and the other is used to select the feedback resistor for the buffer and gain stage 54. Another output from the memory and I/O decoding circuit 72 is connected to enable the trigger circuit 46, while yet another is connected to enable the analog-to-digital converter 56 to present its output on the data bus 60.

A series of status LED's 74 are provided on the front panel of the instrument. The LED's 74 are used to indicate the particular parameter, such as kVp, time duration, pulse, relative film exposure, or relative mA, which is currently being displayed on the four-digit output display 64. The LED's 74 are selected by an output from the memory and I/O decoding circuit 72 and by appropriate data words on the data bus 60.

A series of input switches 76 are provided for the user to input selections. The selection input switches are for the type of system being tested; i.e. radiographic or fluoroscopic, as well as the selection of parameter for the display data desired, i.e. kVp, time, RFE, etc. The switches 76 are selected as an input by an output of the memory and I/O decoding circuit 72 which causes the status of the switches to be entered as a byte on the data bus 60 so that they may be read by the microprocessor 58.

An input select latch 78 is also connected to be enabled by an output of the memory and I/O decoding circuit 72. The input select latch 78 receives input from an IR remote detect circuit 80 and a low battery detect circuit 82. The IR remote detect circuit 80 receives a serial data train from a hand-held remote control unit 81 which sends coded instructions by infrared transmission to the instrument for remote operation. The detection of infrared input information by the IR remote detect circuit 80 also generates signal connected as an interrupt to the microprocessor 58 to alert it to the presence of this information. Thus once the interrupt operates the microprocessor 58, a routine is initiated to monitor the input signal received by the IR remote detect circuit 80 so that remote operation is obtained. The remote control unit 81 includes switches similar to those on the input switch panel 76 so that the parameter on the display 64 can be selected. A low battery detect circuit 82 provides for sensing of low battery condition. Other inputs to the input select latch 78 may be jumpered so that when the word or the latch 78 is imposed on the data bus 60, hand-wired instructions as to desired mode of operation may be given to the microprocessor 58.

In its general operation, the device as illustrated in FIG. 1 is intended to measure a variety of the characteristics of a diagnostic radiological x-ray machine. The instrument may be used for radiographic or fluoroscopic x-ray units. The instrument is placed on the x-ray table of a diagnostic x-ray machine and the unit is operated as if it was being used in a diagnostic setting. The x-rays impinge upon the photodiodes 12 through 22 creating a series of signals in them. The signals from diodes 12 and 14 are averaged, as are the combined signals from photodiodes 16 and 18, and then the two sets of signals are amplified by the preamplifiers 32 and 34, with the gain controlled by the switch gain control circuit 40 as operated by the microprocessor 58. The signals from the photodiodes 20 and 22 pass directly through amplifiers 42 and 48. All the outputs from the preamplifiers are multiplexed by the signal multiplexer 32, under control of the microprocessor 58, and are then passed to the buffer and gain stage 54. The signals are then converted to digital form by the analog-to-digital converter 56. The microprocessor can then read the output of the analog-to-digital converter 56 by imposing a proper address on its address bus 66 which operates the memory and I/O decoding circuit 72 to actuate the analog-to-digital converter 56 to present its output on the data bus 60. The microprocessor 58 can then operate, in accordance with its programming, to sequentially operate the signal multiplexer 52 to sample each of the four signals which enter the multiplexer, so that a multiplexed output is ultimately obtained from the analog-to-digital converter 56, so that each of the four input channels can be separately monitored over time. In accordance with the settings of the switch input 76, or the direction of the IR remote control unit 81, as detected by the IR remote detector circuit 80, the microprocessor then proceeds through its radiological analysis to determine the various parameters which are desired to be measured of the radiographic unit and then to display the result. The output of the microprocessor 58 is displayed to the user on the display 64, or can be directly read through serial I/O port 62 to a separate computer or other digital electronic device.

In order that the operation of this unit, and in particular its software implementation, it can be described in greater detail, several of the operations will now be described in more detail.

The particular function which is to be measured by the instrument during any single x-ray exposure is determined either by the buttons selected on the switch input 76 or by instructions which are entered through the infrared remote control unit 81 as read by the IR remote detect circuit 80. The functions vary slightly depending on whether the instrument has been selected to operate for radiographic instrument or for a fluoroscopic instrument. The software of the instrument is capable, during a first test radiographic image, of determining the appropriate type of x-ray unit which is being tested, i.e. whether the unit is continuous phase, three phase, or single phase x-ray unit. This analysis is done by monitoring the wave form of the first x-ray exposure and analyzing the peaks and valleys of the particular wave form which the instrument has detected.

The first value which is measured by the unit is kVp. When the kVp function is implemented, by pressing the appropriate button, the instrument displays on the display 64 the kV potential value for the previous x-ray exposure. However, if this button is pressed prior to, or immediately following, the very first x-ray exposure when the unit is placed in a radiographic mode, the press of this button toggles the display to display the available x-ray unit type so that the user can manually select the type of x-ray unit which is being monitored to override the determination made by the software from the first exposure. This is a progammable option which may or may not be used by the user. This feature is not applicable to fluoroscopic machines. For the display of the kVp value, the user may elect to view either the effective kVp or the peak kVp values. Effective kVp is a measurement of kV potential for the x-ray unit obtained by integration of the wave form data within a time frame specified by the time measurement entered by the user. Peak kVp value represents a measurement of peak kV potential during the time frame specified by the user. The front panel display button allows the user to toggle between these two parameters.

The time button on the front of the instrument displays the length of time for the previous exposure that the instrument was exposed to assuming that the x-ray unit was a radiographic three phase or continuous phase instrument. For fluoroscopic or for radiographic single phase units the display remains blank if the time parameter is selected.

The pulse input selected by the input switches 76 displays the number of pulses for the previous exposure if the x-ray unit was exposed to a radiographic single phase unit. For other types of displays, the selection of this button leads to a blank display.

The RFE input selects switch 76 displays the relative film exposure for the previous x-ray exposure. This is the result of the measurement taken by the photodiode 20 and analyzed by the software implemented by the microprocessor 58, as been described already above. This measurement is designed to correlate to the level of radiation which normally reaches the film contained in the x-ray unit. If this parameter is recorded weekly with fine technical factors, the relative film exposure test creates a base line for measuring exposure consistency of the x-ray unit over time. Such consistency helps to ensure that actual radiation exposure to patients placed in the unit is maintained.

The mA switch of the input switches 76 displays the relative mA for the previous radiographic exposure. The display is again blank for fluoroscopic units. This measurement is not absolute but is relative to the very first exposure conducted by the machine. The measurement may be reset by holding the switch in for at least three seconds so that all subsequent exposures are relevant to the current mA reading rather than to prior ones.

The switch in the front of the machine for selecting fluoroscopic or radiographic x-ray mode implements different modes of operation of the instrument of FIGS. 1 and 2. The calculations performed are the same for each mode but the data sampling for fluoroscopic units is done differently than for radiographic units. The effect of kVp for fluoroscopic units is calculated periodically during data acquisition and during the displays data acquisition is temporarily stopped. For radiographic units, the data is acquired during the entire radiographic image and after the image ceases then the displays and the various parameters can be read out in turn.

The software to implement the monitoring of the instrument of FIG. 1 through the microprocessor 58 has basically two tasks, data acquisition and data display. Only one of these tasks will be in operation at any one time, so therefore multitasking is not necessary. During the exposure of the a radiographic x-ray, the software acquires data using a data sampling interrupt routine. The interrupt routine is commenced by the interrupt signal from the trigger 46. During the time that the unit is not being exposed to x-ray energy, the various switches in the switch input 76, or the infrared remote hand held unit 81, can be implemented to display the various parameters which were developed by the instrument during the previous x-ray exposure.

A background processing loop is intended to be running at all times. This loop monitors the operation of the switch input 76 and also monitors the output of the trigger circuit 46 to determine when a new x-ray exposure is being initiated. When the x-ray exposure is in process, program control remains in a loop of an interrupt processing routine until the exposure is completed. When the exposure is completed, processing is returned to the background loop and all the test results are calculated and stored. During the time of data acquisition, pressing of the various buttons should have no effect.

The data acquisition interrupt begins with the detection of impinging x-ray values as detected by the trigger 46 from the output of the buffer and gain stage 54. The interrupt is provided to the microprocessor 58. A background threshold level is established by hardware, such that only a sensed level above a certain background is considered to be a true x-ray measurement. The x-ray interrupt processing routine, once initiated, begins a data sampling routine for the collection and storage of data samples from the four channels of the instrument. The data sampling interrupt is set to occur approximately every 0.5 milliseconds. The interrupt process reads the actual data sample and the hardware automatically toggles between the channels to prepare for the next reading. While data sampling periodically is adequate during much operation, it is occasionally appropriate to store an entire wave form as detected by a single channel of the instrument. This might be done, for example, during the first set of exposures so that the instrument can determine the nature of the x-ray machine into which it is being inserted. Continuous sampling is implemented upon such a procedure and the characteristics of the wave form are collected and stored. The peaks in the wave form are then found for the time, pulse, and peak kV calculations. By analysis of the peaks and valleys of the wave form it can be determined what the character of the x-ray instrument is.

Thus, in the x-ray beam characteristic detection and analytical instrument constructed in accordance with the present invention offer significant advantages over similar devices known to the prior art. The implementation of a microprocessor based system allows for the addition of several novel features not previously available in instruments of this type. First, the implementation of an infrared remote control unit allows the user to access all modes of operation available in the front panel of the unit from a remote location even outside the x-ray room. Therefore, using this feature, the operator of the instrument can place the instrument in the x-ray chamber, and then expose it to successive cycles of x-ray radiation without re-entering the x-ray room. Between cycles, using the hand held remote control unit, the user can direct the instrument to display on its display 64 the various parameters measured during each subsequent exposure of the instrument. Thus the instrument can be used for a whole series of x-ray exposures, and all of the parameters read out for each exposure, without the operator having to re-enter the x-ray chamber during the entire test procedure.

The provision for the feature of relative film exposure is an advantageous one in that it allows the operator to determine the actual exposure consistency of the x-ray machine. By measuring the amount of total integrated radiation passing through a copper filter, the relative film exposure text approximates the decrease in x-ray intensity resulting from a patient exposure. This measurement correlates to the level of radiation which would normally be expected to reach the x-ray film. It is thus possible to create a base line for measuring exposure consistency using this parameter.

The provision for the mA linearity detector is used to measure the linearity of the actual output from the x-ray unit over a series of ranges.

The invention has other features and improvements, and is defined by the scope of the following claims.

What is claimed is:

1. Apparatus for the measurement of the characteristics of an x-ray beam from an x-ray machine comprising
   (a) a plurality of detectors designed and arranged to generate signals corresponding to a plurality of characteristics of an x-ray beam;
   (b) multiplexing means connected for selecting among the output signals from the detectors;
   (c) an analog-to-digital converter connected to convert the output of the multiplexing means to digital form;
   (d) a microprocessor connected to control the multiplexing means and to receive output from the analog-to-digital converter to sample the data received therethrough from the detectors and to calculate a plurality of parameters about the measured characteristics of the x-ray beam;
   (e) display means connected to the microprocessor so that a calculated parameter may selectively be displayed thereon;
   (f) an infrared remote control unit emitting an infrared remote control signal; and
   (g) an infrared remote control detect circuit connected to the microprocessor and adapted to receive the infrared remote control signal from the remote control unit so that a user using the remote control unit can selectively cause the microprocessor to display selected ones of the calculated parameters on the display means without the user needing to be physically close to the instrument.

2. Apparatus as claimed in claim 1 wherein the detectors are arranged and filtered so that the apparatus measure, the characteristics of kVp, relative film exposure and relative mA of the x-ray unit.

3. Apparatus as claimed in claim 1 wherein the calculated parameters of the x-ray beam include effective kVp, peak kVp, time of x-ray exposure, number of pulses, relative film exposure, and relative mA of the x-ray exposure.

4. Apparatus as claimed in claim 1 wherein the infrared remote control circuit has an output connected as an interrupt input to the microprocessor so that the microprocessor will thereafter receive and analyze the signal received from the remote control unit.

5. Apparatus as claimed in claim 1 wherein the display means is a single multiple digit numerical display.

* * * * *